J. W. GARD.
CISTERN.
APPLICATION FILED MAY 22, 1912.
1,039,924.
Patented Oct. 1, 1912.
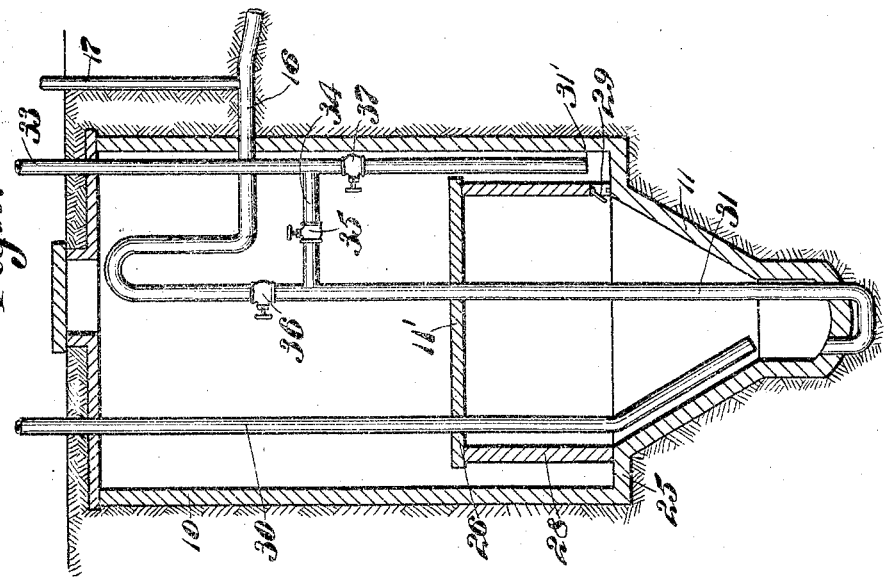
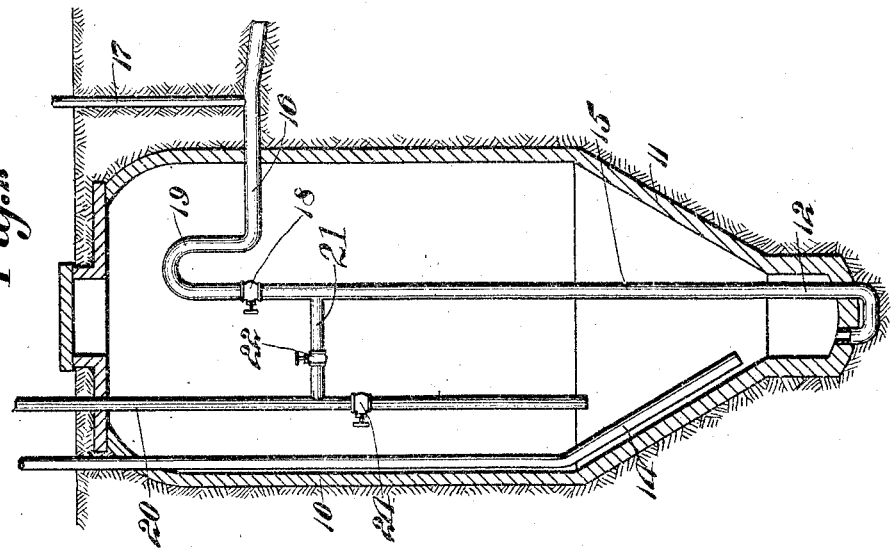
John W. Gard, Inventor
by C. A. Snow & Co.
Attorneys
Witnesses

_UNITED STATES PATENT OFFICE._

JOHN W. GARD, OF KOKOMO, INDIANA.

CISTERN.

1,039,924.   Specification of Letters Patent.   Patented Oct. 1, 1912.

Application filed May 22, 1912. Serial No. 699,047.

*To all whom it may concern:*

Be it known that I, JOHN W. GARD, a citizen of the United States, residing at Kokomo, in the county of Howard and State of Indiana, have invented a new and useful Cistern, of which the following is a specification.

This invention relates to cisterns.

The primary object of the invention is to provide means for removing the sediment from the cistern, the sediment in its removal being conducted from the cistern without contacting with the clear water.

A further object of the present invention is to provide means for removing all of the water or a portion of the same from the cistern through the clear water outlet pipe, to remove the sediment from the cistern.

A still further object of the invention is to provide a structure in which the incoming water, containing the sediment does not mix with the clear water in the upper portion of the cistern, the upper wall of the cistern in this manner being kept clean, the depositing of the sediment at the base of the cistern facilitating its ready removal.

With the foregoing and other objects in view which will appear as the description proceeds, the invention resides in the combination and arrangement of parts and in the details of description hereinafter described and claimed, it being understood that changes in the precise embodiment of the invention herein disclosed can be made within the scope of what is claimed without departing from the spirit of the invention.

In the drawings—Figure 1 is a vertical section. Fig. 2 is a similar view, showing a slightly modified form of cistern, in which a filter is interposed between the receiving chamber of the cistern, and the chamber from which the water passes to the clear water outlet.

In the drawings, 10 designates the cistern which is formed with the sloping bottom walls 11 which communicate with the sediment chamber 12. The water is introduced in the cistern through the pipe 14 which terminates immediately above the chamber 12. The sediment is siphoned from the chamber 12 through the pipe 15 which passes upward through the cistern, the sediment being conducted off through the outlet pipe 16 which is connected in the pipe 15 adjacent the goose-neck 19, this valve 18 being normally open when the sediment is being removed from the cistern, the valve being closed when it is desired to close the outlet 16. The clear water is drawn from the cistern through the pipe 20, suction being created by any suitable form of pump, the pipe 20 terminating adjacent the upper end of the conical wall 11. The sediment outlet pipe 16 and the clear water outlet 20 are connected by the by-pass 21, a valve 22 being positioned in said by-pass, a valve 24 being positioned in the pipe 20 immediately below the point where the by-pass 21 joins the pipe 20. It will be noted by this construction that when there is not sufficient clean water to carry the sediment out of the cistern, that a portion or all of the water may be pumped out of the cistern by closing the valves 24 and 18 and opening the valve 22 and the by-pass 21, the suction created in the pipe 20 drawing as much water out of the cistern as is necessary to clean the cistern. It will be noted by this construction that the sediment in the chamber 12 will be siphoned through the pipe 15, passing out through the outlet 16 which is provided with the air vent 17, and that when it is desired to completely drain the cistern, the normal outlet of the pipe 20 and the outlet of the sediment pipe 15 may be closed and the water drawn through the sediment pipe 15 and the water outlet 20, the valves 22 in the by-pass being open. The many advantages of this construction will be clearly apparent, as it will be noted that the same forms an efficient sediment remover, together with means for drawing off all of the water from the cistern.

In the form shown in Fig. 2, the cistern 10 is provided adjacent the sloping wall 11 with the annular shoulder 25 which forms a support for a filter 26, which may be of any suitable construction, but which is preferably formed with a cement top 11′ and porous side walls 28, a non-return check valve 29 being disposed adjacent the base of the filter, allowing water to enter the space inclosed by the filter but preventing its passage from said space except through the porous side walls of the same. In this form the inlet pipe 30 extends through the filter and the sediment pipe 31 which is of the same construction as that shown in the preferred form also extending from said filter. The pipe through which the clear water is drawn terminates short of the shoulder 25, its terminal 31' extending parallel with the side wall of the filter. The clear water outlet 33 and the sediment pipe 31 are connected by the by-pass 34 which is provided with a valve 35, valves 36 and 37 being disposed in the same relative position as the valves 18 and 24.

Attention is called to the fact that the operation in the modified form is practically the same as that of the preferred form, except that the water previous to passing out through the clear water outlet is conducted through the filter 26. It will be noted that in both forms the apparatus is such as may be easily and economically manufactured and that the same may be readily positioned within the cistern, and being at all times accessible for the purpose of repair.

It will be noted that when heavy rains occur, the same will cause a rapid filling of the cistern and that as the water will not pass through the filter as rapidly as it enters the cistern, the same will rise, the surplus being forced through the siphon drain.

What is claimed is:—

1. In a cistern, provided with a conical base portion, a sediment chamber arranged below said conical base portion, a water inlet and outlet, a sediment outlet pipe communicating with the sediment chamber, a connection between said sediment pipe and the outlet pipe, and valves disposed in said connection and both of said pipes.

2. In a cistern, provided with a conical base, a shoulder formed adjacent said base, a filter resting on said shoulder, an inlet pipe extending through said filter and a clear water outlet pipe extending within the cistern, a non-return check valve arranged in the filter, a sediment outlet pipe, valves disposed in the clear water outlet pipe and the sediment outlet pipe and a valved connection between said pipes.

In testimony that I claim the foregoing as my own, I have hereto affixed my signature in the presence of two witnesses.

JOHN W. GARD.

Witnesses:
JOHN B. JOYCE,
AGNES RIESER.